United States Patent
McNertney, Jr. et al.

(10) Patent No.: US 7,021,248 B2
(45) Date of Patent: Apr. 4, 2006

(54) PASSIVE SYSTEM FOR OPTIMAL NOX REDUCTION VIA SELECTIVE CATALYTIC REDUCTION WITH VARIABLE BOILER LOAD

(75) Inventors: Robert M. McNertney, Jr., Canal Fulton, OH (US); Steven P. Iannacchione, Canal Fulton, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 220 days.

(21) Appl. No.: 10/236,854

(22) Filed: Sep. 6, 2002

(65) Prior Publication Data

US 2004/0045513 A1 Mar. 11, 2004

(51) Int. Cl.
*F22B 37/00* (2006.01)

(52) U.S. Cl. .................. 122/7 R; 122/4 D; 422/177
(58) Field of Classification Search .............. 122/4 D, 122/7 R; 422/173, 177
See application file for complete search history.

(56) References Cited

U.S. PATENT DOCUMENTS

| | | | |
|---|---|---|---|
| 4,160,009 A | 7/1979 | Hamabe | |
| 5,423,272 A | 6/1995 | Dunn, Jr. et al. | |
| 5,555,849 A | 9/1996 | Wiechard et al. | |
| 5,775,266 A | 7/1998 | Ziegler | |
| 5,911,956 A | 6/1999 | Lamare et al. | |
| 5,943,865 A | 8/1999 | Cohen | |
| 6,125,634 A | 10/2000 | Wittchow | |

OTHER PUBLICATIONS

*Steam*, Its Generation and Use, 40th Edition, The Babcock & Wilcox Company, ©1992, p. 19–0 to 19–6 and p. 34–1 to 34–9.

Nischt et al., "Recent SCR Retrofit Experience on Coal–Fired Boilers," POWER–GEN International 1999, Nov. 30—Dec. 2, 1999, New Orleans, LA, Figure 4, p. 1–11.

*Primary Examiner*—Jiping Lu
(74) *Attorney, Agent, or Firm*—Michael J. Seymour; Eric Marich

(57) ABSTRACT

A passive system for recovering energy and nitrogen oxides from flue gas produced by a boiler, and which employs a particular arrangement of economizer surface to ensure that the temperature of the flue gas entering a selective catalytic reduction (SCR) reactor is maintained within a required range over a wide range of boiler loads.

9 Claims, 5 Drawing Sheets

PASSIVE SYSTEM FOR OPTIMAL NOX REDUCTION VIA SELECTIVE CATALYTIC REDUCTION WITH VARIABLE BOILER LOAD

FIELD AND BACKGROUND OF THE INVENTION

The present invention is generally drawn to boilers using an economizer to transfer waste heat in flue gas to boiler feedwater and employing Selective Catalytic Reduction (SCR) reactors to remove NOx from the flue gas, and, more particularly, to the optimized temperature operation of same over a variable load range.

In fossil-fuel fired boiler systems economizers perform a key function in providing high overall boiler thermal efficiency by recovering the low level, i.e. low temperature, energy from the flue gas. Economizers recover the energy by heating the boiler feedwater, thereby cooling the flue gas. For each 40 degrees F. (22 degrees C.) that the flue gas exit stack temperature is cooled the overall boiler efficiency increases by approximately 1%.

Economizers are typically tubular heat transfer surfaces used to preheat boiler feedwater supplied to the boiler. As shown in FIG. 1, a common economizer design uses bare, in-line, serpentine tubes with the flue gas flowing vertically downward in a cross counter-flow heat exchange relationship with boiler feedwater 150 flowing upwardly through the tubes. Due to the relatively small difference between the temperature of the flue gas and the temperature of the boiler feedwater, economizers require a large amount of heat transfer surface per unit of heat recovered. In some applications, fins may be applied to the outside of the tubes to improve the controlling gas side heat transfer rate. The economizer is generally the last water-cooled heat transfer surface upstream of an air heater, a gas-gas heat exchanger used to preheat the combustion air.

SCR reactors are used to reduce impurities from the flue gases, or exhaust gases, of boiler and furnaces, and in particular, to reduce NOx emissions. Ammonia or an ammonia precursor is injected into the boiler flue gas stream in the presence of a catalyst. Chemical reactions occur with the flue gas, which removes a large portion of NOx from the flue gas and converts it to water and elemental nitrogen. The SCR reactions take place within a required temperature range. Most can operate within a range of 450 to 840 degrees F. but optimum performance occurs between 500 to 750 degrees F. Outside of the recommended temperature range, many catalyst materials become less effective or fail to perform the intended function. Further, flue gases containing sulfur oxides are further restricted to lower limit temperatures from 600 to 650 degrees F. to avoid degrading the performance of a downstream air pre-heater.

Additional details of SCR systems for NOx removal are provided in Chapter 35 of *Steam/its generation and use*, 40th Edition, Stultz and Kitto, Eds., Copyright ©1992, The Babcock & Wilcox Company, the text of which is hereby incorporated by reference as though fully set forth herein.

Since SCR reactions take place within a required temperature range, the SCR reactors are typically located downstream of the economizer flue gas outlet of a steam generator or boiler and upstream (with respect to a direction of flue gas flow) of any air heater devices used to preheat the incoming combustion air.

For economic reasons the desired gas temperature entering the SCR reactor should be maintained in the required range at all loads, from full load down to partial loads. Also, maintaining the desired flue gas temperature reduces the formation of ammonia and/or sulfate salts within or on the ammonia injection system and the catalyst. However, as boiler load decreases, the boiler exit gas temperature will drop below the optimal temperature range. To increase the gas temperature to the required temperature range while minimizing the impact on full load thermal efficiency, current practice has been to use an economizer gas bypass flue 80, shown in FIG. 2. The economizer gas bypass flue 80 is used to remove some of the hotter flue gases upstream of the economizer, and then recombine the hotter flue gas with cooler flue gas that leaves the economizer thereby raising the overall flue gas temperature. By controlling the amount of gas that flows through the bypass system, the flue gas temperature entering the SCR reactor can be maintained within the required temperature range at the lower boiler loads.

In another approach to dealing with decreasing flue gas temperature entering an SCR reactor at reduced boiler loads, an economizer was fitted with a modulated partial feedwater bypass to maintain the flue gas temperature at low load without reducing full load thermal efficiency.

Both of the above approaches for mitigating the effects of boiler load changes on the operation of an SCR reactor 20 are active methods requiring the use of valves, dampers or other shut-off means, such as damper 94 shown in FIG. 2.

Retrofit applications of SCR systems to steam generators having limited space present their own particular problems.

The size of the catalyst bed required to achieve effective NOx reduction at a utility power generation station is very, very large. For ease in handling and installation, the blocks are fabricated into large modules. For example, an SCR system built by The Babcock & Wilcox Company and retrofit to a 675 MW coal-fired power station included 31,664 cubic feet (897 cubic meters) of 0.25 in. (6 mm), plate-type catalyst. Such large catalyst arrangements, with their related installation and system modification requirements, are expensive to build.

A sectional side view of one such installation is shown in FIG. 2. In this conventional configuration, SCR reactor 20 of the SCR system includes several catalyst layers 30. Flue gas is discharged from SCR reactor 20 into an existing air heater 60. The SCR system is designed with downflow of the flue gas, after upflow ductwork for an ammonia injection system 10 and mixing. This results in a vertical reactor at a high elevation. As a consequence, construction costs represent a substantial total of the cost of an SCR system, particularly for retrofit systems. With as much as 50% of the capital cost of an SCR retrofit involving construction of the equipment, constructability is thus an important design consideration for cost reduction. While existing structural steel 50 may be used, the FIG. 2 shows that a large amount of new structural steel 40 is needed to bear the weight of the SCR system, and the associated upstream and downstream flues. The foundation for the SCR system and structural steel must also be taken into consideration, and may require modification for retrofit installations.

Increasingly stringent environmental regulations continue to place pressures upon electric utilities which use fossil-fueled boilers or steam generators to produce electricity. However, modifications to existing boilers are often problematic due to the limited space available, and the utilities' desire to make such modifications in an efficient manner and at minimum cost. Thus improvements that allow for more economic installation and operation of SCR reactors for boiler flue gas cleanup would be welcomed by industry.

SUMMARY OF THE INVENTION

The present invention is drawn to a system for removing waste heat and nitrogen oxides from boiler flue gas using a split economizer arrangement having a first economizer upstream of a selective catalytic reduction reactor and a second economizer downstream of the reactor. In one embodiment, the flue gas is preferably directed upwardly through the first economizer in a cross co-current heat exchange relationship with boiler feedwater flowing upwardly within the economizer tubes. The first economizer cools the flue gas to a temperature range needed for efficient removal of nitrogen oxides by catalyst in the reactor. A second economizer, downstream of the selective catalytic reduction reactor further heats boiler feedwater and cools the flue gas, thereby improving thermal efficiency.

In another embodiment, the flue gas may be directed horizontally in a cross flow relationship with the economizer tubes, as it flows though one or both of the economizers.

Accordingly, one aspect of the invention is drawn to a system for recovering energy and removing nitrogen oxides from flowing flue gas, comprising a reactor having a catalyst operative between a first temperature and a second temperature lower than the first temperature for removing nitrogen oxides from the flue gas. A first economizer, in fluid communication with and located upstream of the reactor, has a plurality of water cooled tubes disposed in a cross co-current heat exchange relationship with the flowing flue gas. The first economizer cools the flue gas to a temperature less than the first temperature and greater than the second temperature. A second economizer, in fluid communication with and located downstream of the reactor, has a plurality of water cooled tubes disposed in a cross counter-current heat exchange relationship with the flowing flue gas. The second economizer cools the flue gas to a temperature less than the second temperature.

Another aspect of the invention is drawn to a system for recovering energy and removing nitrogen oxides from flowing flue gas, comprising a reactor having a catalyst operative between a first temperature and a second temperature lower than the first temperature for removing nitrogen oxides from the flue gas. A first economizer is arranged in fluid communication with and located upstream of the reactor. The first economizer cools the flue gas to a temperature less than the first temperature and greater the second temperature. The first economizer also has an inlet for receiving flue gas and an outlet, located above the inlet, for discharging flue gas. A second economizer is arranged in fluid communication with and located downstream of the reactor. The second economizer cools the flue gas to a temperature lower than the second temperature. The second economizer has a second economizer flue gas inlet for receiving the flue gas, and a second economizer flue gas outlet, located below the inlet, for discharging the flue gas.

Yet another aspect of the invention is drawn to a system for recovering energy and removing nitrogen oxides from flowing flue gas, comprising a plurality of reactors each having a catalyst operative between a first temperature and a second temperature lower than the first temperature for removing nitrogen oxides from the flue gas. A first economizer is arranged in fluid communication with and located upstream of the plurality of selective catalytic reduction reactors. The first economizer cools the flue gas to a temperature less than the first temperature and greater than the second temperature. The first economizer also has an inlet for receiving flue gas and an outlet, located above the inlet, for discharging flue gas. A plurality of second economizers, each of which is in fluid communication with and located downstream of an associated reactor, cools the flue gas to a temperature lower than the second temperature. Each of the second economizers has a second economizer flue gas inlet for receiving the flue gas and a second economizer flue gas outlet, located below the inlet, for discharging the flue gas.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
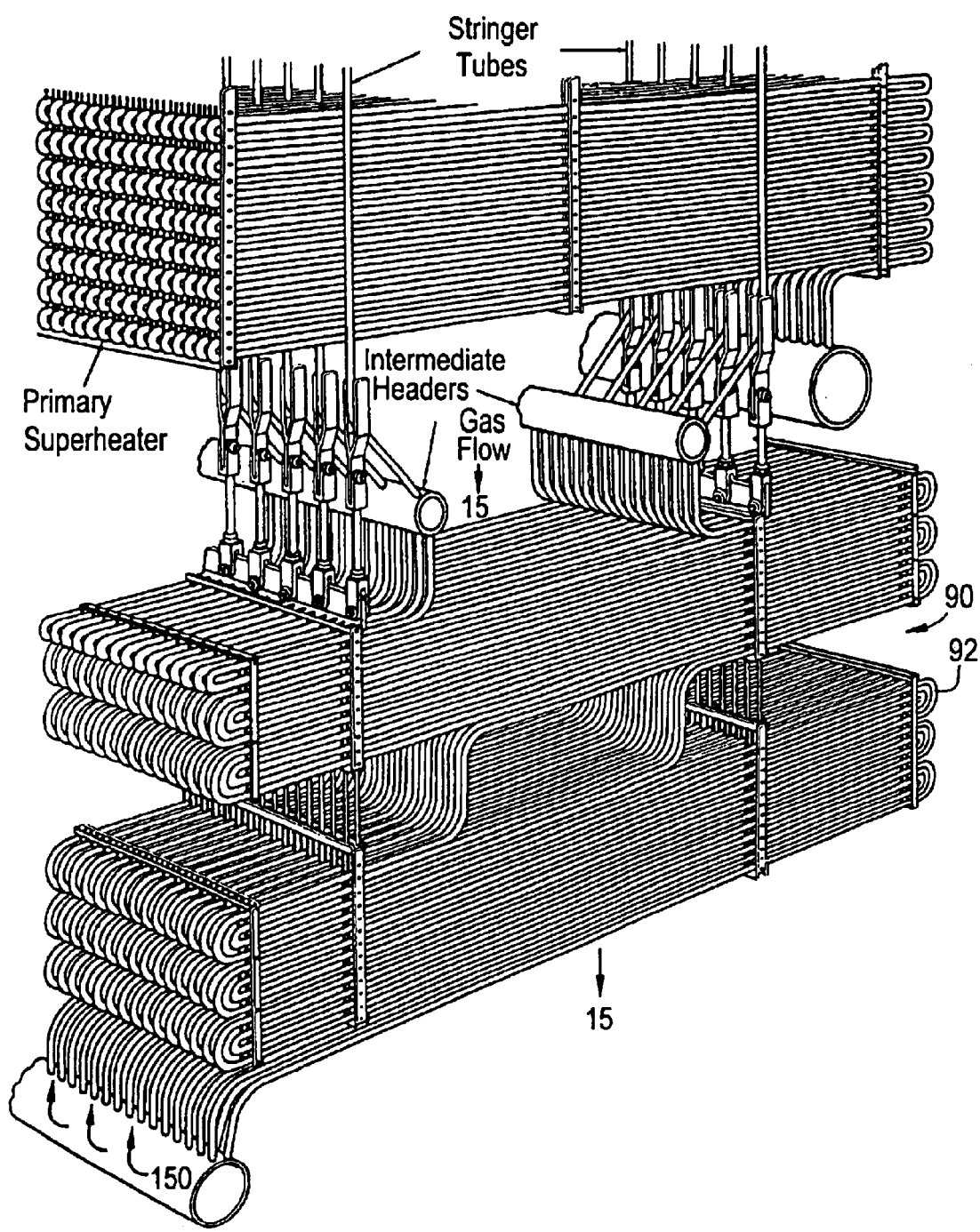
FIG. 1 is a perspective view of typical utility boiler economizer.
Figure 2:
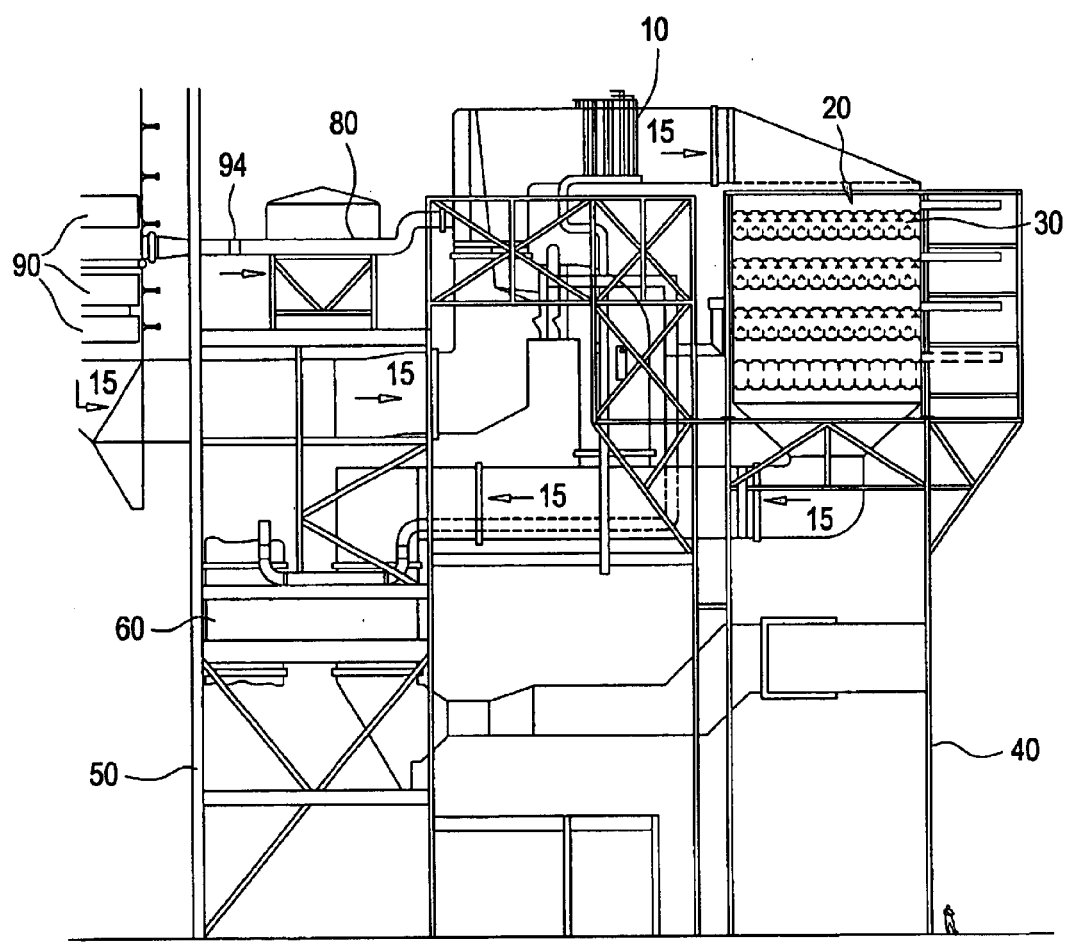
FIG. 2 is a side sectional schematic view of a known SCR system.
Figure 3:
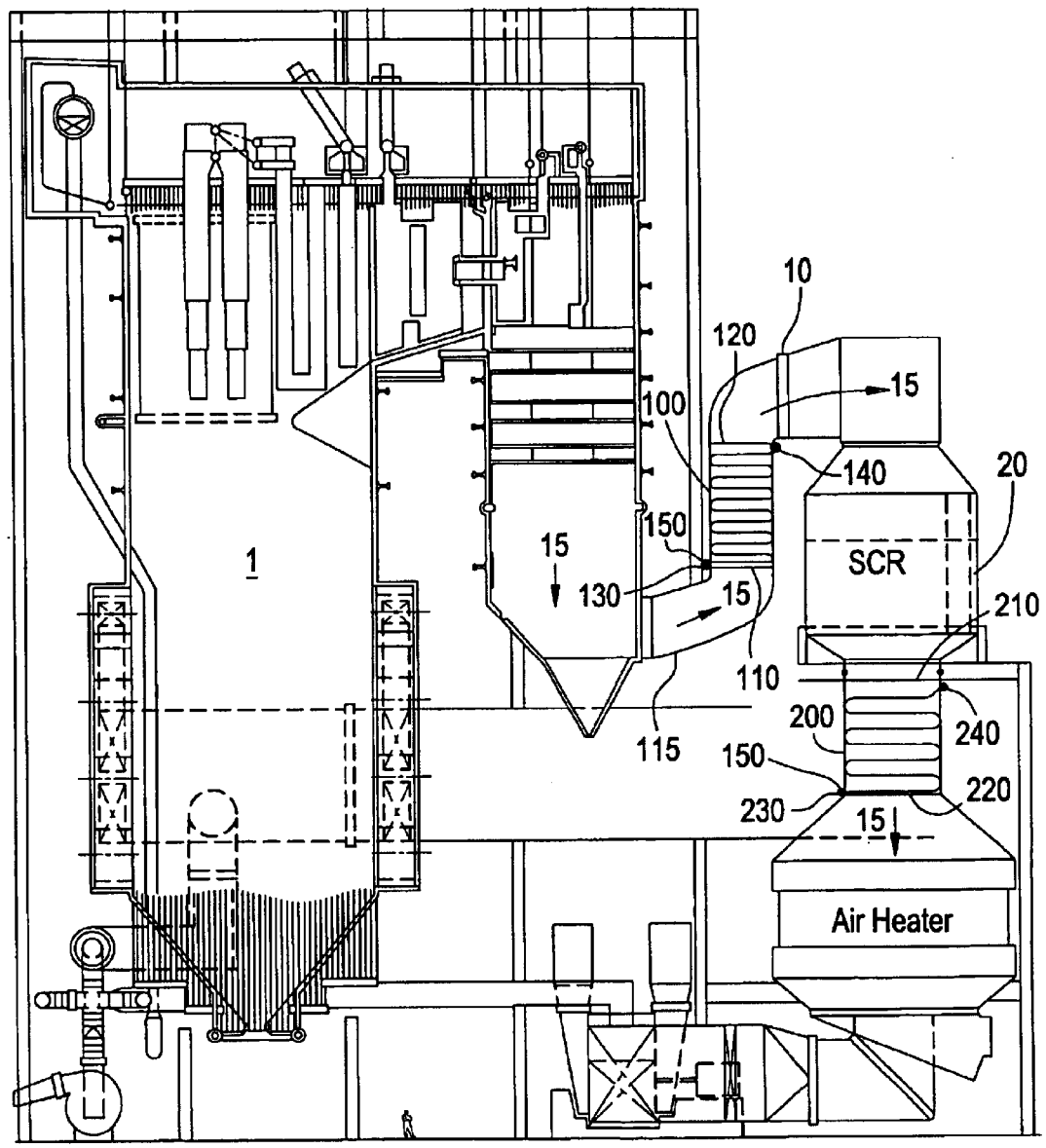
FIG. 3 is a side sectional schematic view of a first embodiment of the invention.

Referring to FIG. 3, flue gas or exhaust gas 15 produced in a boiler 1 and containing nitrogen oxides flows into flue 115. Flue 115 provides the flue gas 15 to a selective catalytic reduction reactor 20, as is known in the art. Reactor 20 contains layers of commercially available nitrogen oxide reduction catalyst 30, such as oxides of titanium ($TiO_2$), vanadium ($V_2O_5$), tungsten ($WO_3$) and molybdenum ($MoO_3$). Catalyst 30 is effective within a required temperature range defined by an upper limit temperature, or first temperature and a lower limit temperature, or second temperature lower than the first temperature. An ammonia injection system 10 injects ammonia or ammonia precursors into the flue gas 15 before the flue gas 15 enters the reactor 20, where nitrogen oxide reduction reactions take place.

A first economizer 100 is installed in flue 115 in fluid communication with reactor 20 in a location upstream of reactor 20 with respect to the flow direction of the flue gas 15. First economizer 100 is comprised of multiple rows of serpentine tubes 92 arranged horizontally back and forth across the flue 115. Flue gas 15 produced in a boiler 1 flows through the flue 115 and across the first economizer 100 via first economizer flue gas inlet 110. The flue gas 15 flows vertically upward through first economizer 100 and exits first economizer 100 via first economizer flue gas outlet 120 located above first economizer flue gas inlet 110. Boiler feedwater 150 enters first economizer 100 via first economizer feedwater inlet header 130. Boiler feedwater 150 flows upward in a meandering fashion through the tubes in first economizer 100 in a cross co-current flow arrangement with the flue gas 15 and exits via first economizer feedwater outlet header 140 located above first economizer feedwater inlet 130. Heat flows from flue gas 15 into boiler feedwater 150 thereby cooling the flue gas 15. First economizer 100 is designed to cool flue gas 15 to a temperature within the above mentioned required temperature range of catalyst 30 when boiler 1 is operated at full load or at reduced loads.

A second economizer 200 is installed in flue 115 in fluid communication with reactor 20 in a location downstream of reactor 20 relative to the flowing flue gas 15. Second economizer 200 is also comprised of multiple rows of serpentine tubes 92 arranged horizontally back and forth within the flue 115. Flue gas 15 exiting from reactor 20 flows through flue 115 across the second economizer 200 via second economizer flue gas inlet 210. The flue gas 15 flows vertically downward across second economizer 200 and exits second economizer 200 via second economizer flue gas outlet 220 located below second economizer flue gas inlet 210. Boiler feedwater 150 enters second economizer 200 via second economizer feedwater inlet header 230 and exits via second economizer feedwater outlet header 240 located above second economizer feedwater inlet 230. Boiler feedwater 150 flows upward in a meandering fashion through second economizer 200 in a cross counter-current flow arrangement with flue gas 15. The flue gas 15 heats the boiler feedwater 150 thereby further cooling the flue gas 15. Second economizer 200 is designed to cool flue gas 15 to a temperature below the above mentioned required temperature range when boiler 1 is operated at full load or at reduced loads, thereby maintaining thermal efficiency.

First economizer 100 is sized and designed so that the temperature of the flue gas 15 leaving the first economizer 100 and entering the reactor 20 remains within the required temperature range over the entire anticipated load range without operator intervention and without the use of dampers or water bypass valves.

The invention is particularly suited for retrofit applications to boilers where the existing economizer can advantageously be removed or modified to install a selective catalytic reduction reactor 20.

Figure 4:
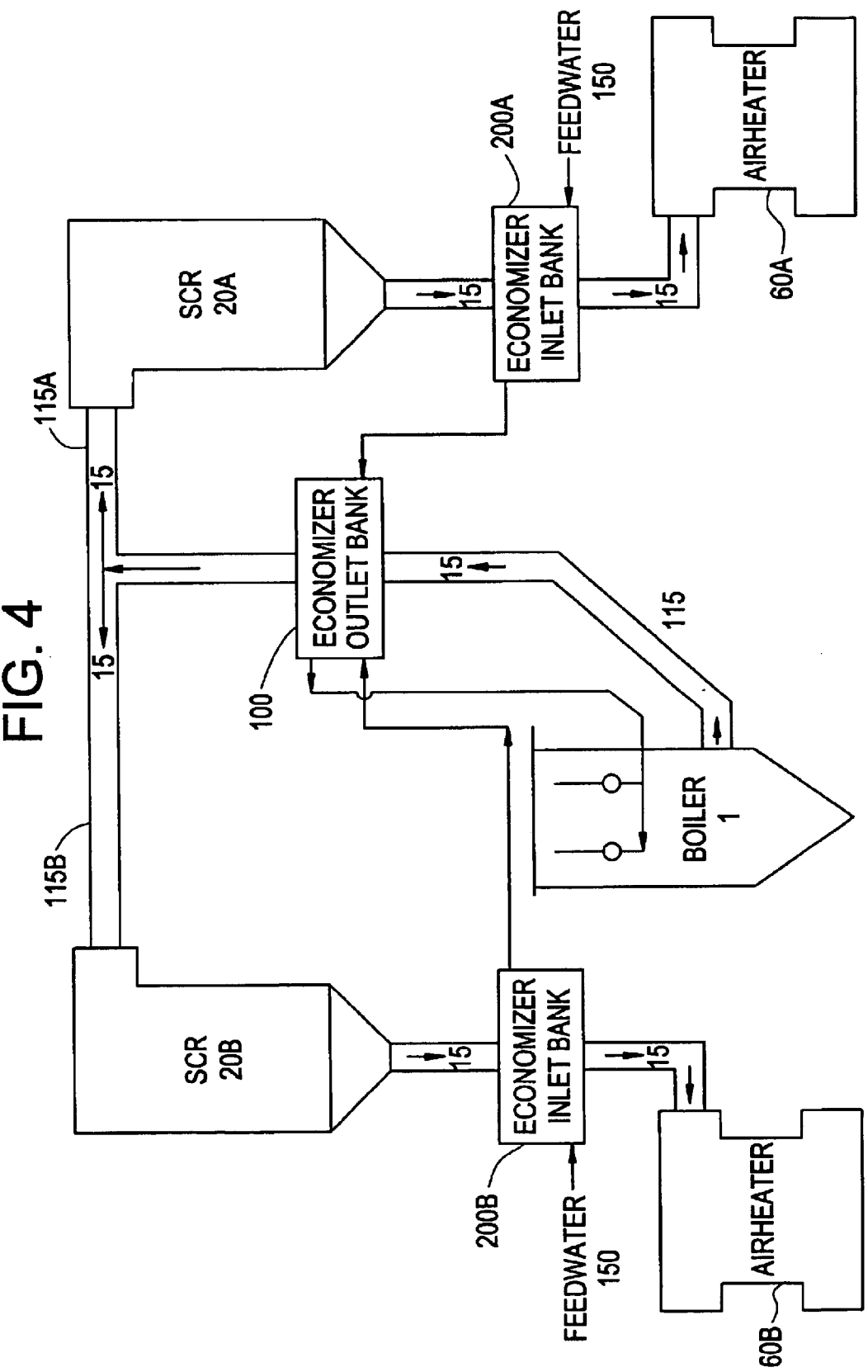
FIG. 4 is a schematic view of a second embodiment of the invention.

In an alternate embodiment, shown in FIG. 4, flue 115 is split into two flues 115a and 115b downstream of first economizer 100. The system then incorporates two sets of reactors, 20a and 20b, and two sets of second economizers, 200a and 200b, downstream of reactors 20a and 20b, respectively. Corresponding air heaters 60a and 60b are located downstream of second economizers 200a and 200b. This approach is useful where a single reactor 20 would be very large and would therefore be more difficult to support. In this arrangement flue gas 15 flows simultaneously in parallel through both sets of reactors 20a and 20b and second economizers 200a and 200b.

Figure 5:
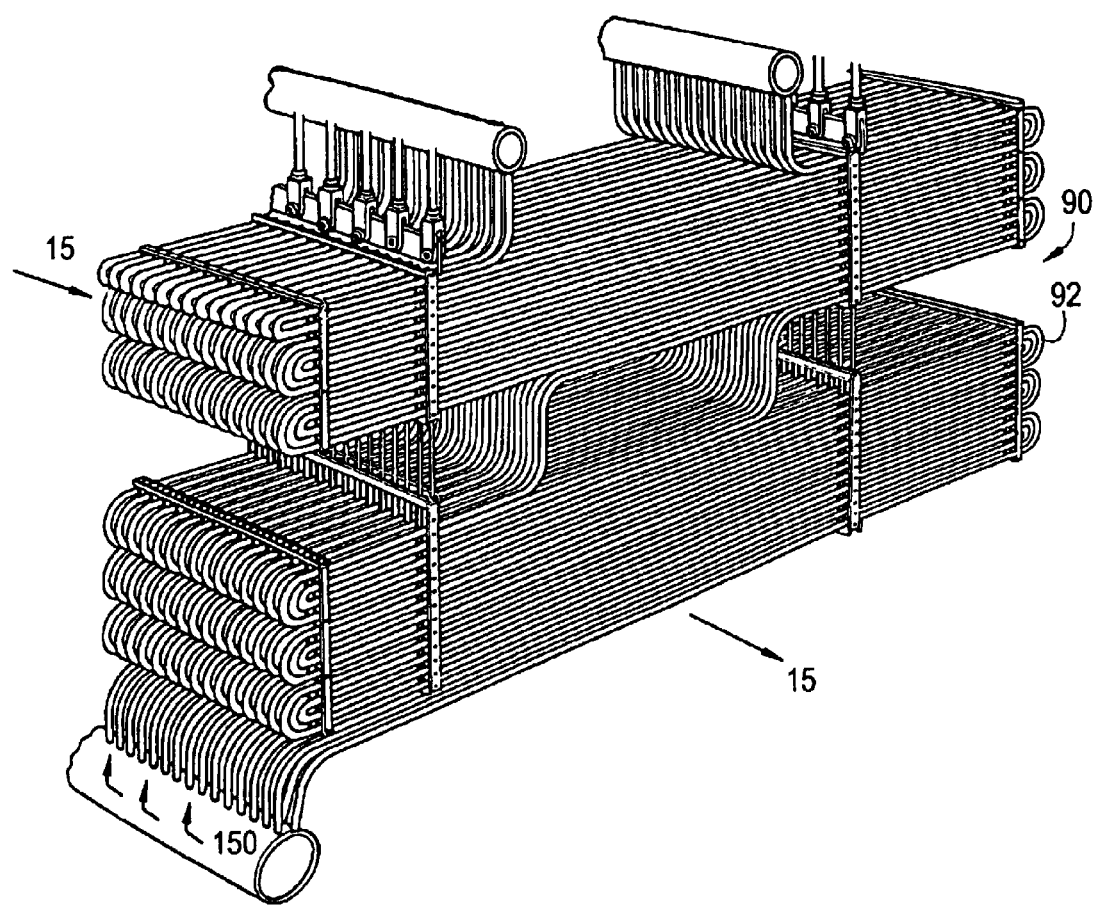
FIG. 5 is a perspective view of a third embodiment of the invention.

In another embodiment, shown in FIG. 5, flue gas 15 is directed horizontally across the economizer tubes 92 in a cross flow heat exchange arrangement with boiler feedwater 150 flowing inside economizer tubes 92. This arrangement can be employed in first economizer 100, second economizer 200 or both depending on design requirements.

For retrofit applications the invention can be practiced by leaving some or all of an existing economizer in place to serve as first economizer 100 and placing additional economizer surface downstream of the reactor 20 to maintain thermal efficiency.

The above embodiments are passive systems for achieving a flue gas temperature range desired for optimal operation of SCR reactor 20 over a full range of boiler load conditions. These systems avoid the complicated water or flue gas bypass arrangements or flow control schemes of current methods of installing or retrofitting SCR reactors. No valves, dampers or other shut-off means are needed.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles. For example, while the subject invention is particularly useful for retrofit applications, it is equally applicable to new boiler installations.

We claim:

1. A system for recovering energy and removing nitrogen oxides from flowing flue gas, comprising:
    a reactor having a catalyst operative between a first temperature and a second temperature lower than the first temperature for removing nitrogen oxides from the flue gas;
    a first economizer, in fluid communication with and located upstream of the reactor, the first economizer having a plurality of water cooled tubes disposed in a cross co-current heat exchange relationship with the flowing flue gas, for cooling the flue gas to a temperature less than the first temperature and greater than the second temperature; and
    a second economizer, in fluid communication with and located downstream of the reactor, the second economizer having a plurality of water cooled tubes disposed in a cross counter-current heat exchange relationship with the flowing flue gas, for cooling the flue gas to a temperature less than the second temperature.

2. The system of claim 1, wherein the flue gas flows vertically upward through the first economizer.

3. The system of claim 1, wherein the flue gas flows vertically downward through the second economizer.

4. The system of claim 1, wherein the first economizer has an inlet for receiving the flue gas and an outlet, located above the inlet, for discharging the flue gas.

5. The system of claim 1, wherein the second economizer has an inlet for receiving the flue gas and an outlet, located below the inlet, for discharging the flue gas.

6. A system for recovering energy and removing nitrogen oxides from flowing flue gas, comprising:
    a reactor having a catalyst operative between a first temperature and a second temperature lower than the first temperature for removing nitrogen oxides from the flue gas;
    a first economizer, in fluid communication with and located upstream of the reactor, for cooling the flue gas to a temperature less than the first temperature and greater than the second temperature, the first economizer having an inlet for receiving flue gas and an outlet, located above the inlet, for discharging flue gas; and
    a second economizer in fluid communication with and located downstream of the reactor, for cooling the flue gas to a temperature lower than the second temperature, the second economizer having an inlet for receiving the flue gas and an outlet, located below the last-named inlet, for discharging the flue gas.

7. The system of claim 6, wherein the flue gas flows vertically upward through the first economizer.

8. The system of claim 6, wherein the flue gas flows vertically downward through the second economizer.

9. A system for recovering energy and removing nitrogen oxides from flowing flue gas, comprising:
    a plurality of reactors each having a catalyst operative between a first temperature and a second temperature lower than the first temperature for removing nitrogen oxides from the flue gas;

a first economizer, in fluid communication with and located upstream of the plurality of reactors, the first economizer, for cooling the flue gas to a temperature less than the first temperature and greater than the second temperature, the first economizer having an inlet for receiving flue gas and an outlet, located above the inlet, for discharging flue gas; and a plurality of second economizers, each of said second economizers in fluid communication with and located downstream of an associated reactor, for cooling the flue gas to a temperature lower than the second temperature, each of said second economizers having an in let for receiving the flue gas and an outlet, located below the last-named inlet, for discharging the flue gas.

* * * * *